United States Patent [19]
Van Zon

[11] Patent Number: 4,971,448
[45] Date of Patent: Nov. 20, 1990

[54] VIDEO SIGNAL PROCESSING CIRCUIT

[75] Inventor: Cornelis C. A. M. Van Zon, Eindhoven, Netherlands

[73] Assignee: U.S. Philips Corporation, New York, N.Y.

[21] Appl. No.: 362,532

[22] Filed: Jun. 7, 1989

[30] Foreign Application Priority Data

Jul. 15, 1988 [NL] Netherlands .................. 8801802

[51] Int. Cl.[5] ...................... H04N 5/272; H04N 5/268
[52] U.S. Cl. ....................................... 358/181; 358/183
[58] Field of Search ........................... 358/183, 22, 181

[56] References Cited

U.S. PATENT DOCUMENTS

| | | | |
|---|---|---|---|
| 4,750,038 | 6/1988 | Welles | 358/183 |
| 4,750,212 | 6/1988 | Yokomizo | 358/183 |
| 4,768,083 | 8/1988 | Romesburg | 358/22 |
| 4,860,106 | 8/1989 | Taupin | 358/181 |

FOREIGN PATENT DOCUMENTS 61-247178 11/1986 Japan .
62-13172 1/1987 Japan .

OTHER PUBLICATIONS

"Picture-In-Picture Digital Color Television Receiver", by Tsuneo Miyamoto, Mitsuo Hirose and Masaur Takeshita; 298 NEC Research & Development, No. 86 (1987).

Primary Examiner—Tommy P. Chin
Attorney, Agent, or Firm—Edward W. Goodman

[57] ABSTRACT

In a video signal processing circuit with a field memory circuit (9) for, a field frequency doubling of a first video signal and a second video signal, in which the second video signal can be displayed in a sub-picture of the main picture determined by the first video signal, it is not necessary to use an additional field memory for obtaining the sub-picture if a line memory circuit (157) is used for temporarily storing the second video signal (65) which is not synchronized with the first video signal (1). During line retrace periods of the first video signal, the second video signal is then transferred (31, 29, 5, 7; 19, 35, 13; 105, 103, 101, 107, 99) from this line memory circuit to a section (39) of the field memory circuit (9) corresponding to the sub-picture.

4 Claims, 1 Drawing Sheet

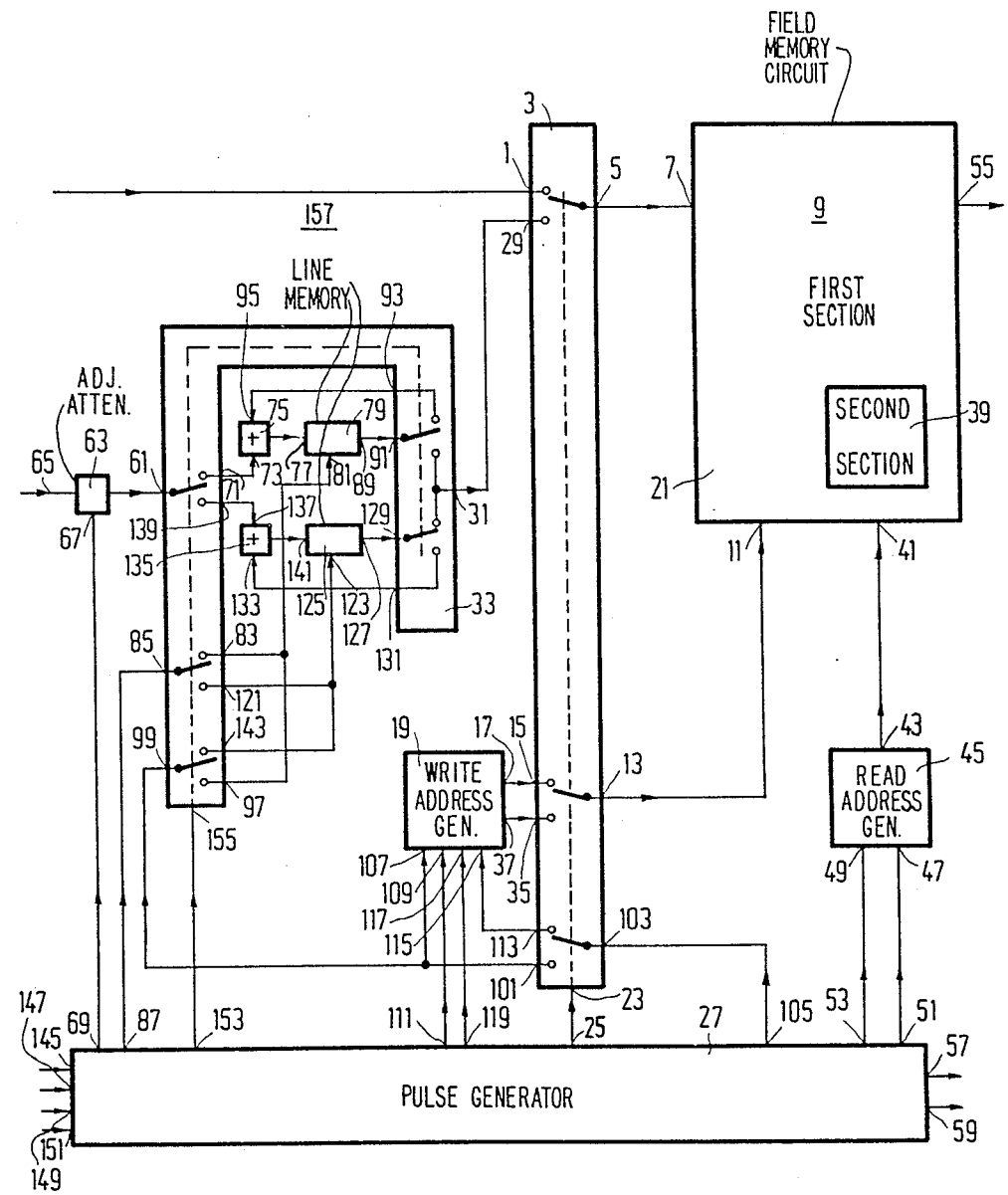

1

VIDEO SIGNAL PROCESSING CIRCUIT

BACKGROUND OF THE INVENTION

1. Field of the Invention

The invention relates to a video signal processing circuit for processing at least a first and a second video signal, the circuit comprising a field memory circuit a first switching device operable by means of a time selection signal for writing the first and the second video signals into a first and a second section, respectively, of the field memory circuit corresponding to a first and a second part, respectively, of a picture to be displayed, and a second switching device

2. Description of Related Art

A video signal processing circuit of the type described above is known from European patent Specification EP-B 0,111,374 in which the field memory circuit is used as a field frequency doubling circuit for the video signals. The first video signal is used for obtaining a normal television picture and the second video signal is used for obtaining, for example, a sub-title in this television picture. The time selection signal then determines the position of the subtitle. The second switching device is present at the output of the field memory circuit and is operated by a further time selection signal which corresponds to the previously mentioned time selection signal which has been doubled in field frequency. The second switching device prevents the second video signal from being conveyed via a digital-to-analog converter circuit which is required for converting the first video signal.

SUMMARY OF THE INVENTION

It is an object of the invention to provide another possibility of application of a video signal processing circuit of the type described in the opening paragraph, while using a limited quantity of additional circuit elements:

To this end, a video signal processing circuit of the type described in the opening paragraph is characterized in that it is possible to switch on, by means of the first switching device, the writing and addressing of the first video signal into the first section of the field memory circuit during at least a part of the line trace periods of this signal and the writing and addressing of the second video signal into the second section of the field memory circuit during at least a part of the line retrace periods of the first video signal, while the second switching device forms part of a write and read circuit of a line memory circuit for the second video signal for writing the second video signal in the line memory circuit and for reading said second video signal from the line memory circuit to the field memory circuit.

The use of the line memory circuit for the second video signal and the transfer of the second video signal from the line memory circuit to the field memory circuit during the line retrace periods of the first video signal provide the possibility of using as a second video signal, for example, a video signal originating from a transmitter other than that for the first video signal for display in a part of a picture to be displayed, which picture corresponds to the first video signal A sub-picture of the second video signal is then obtained without an extra field memory circuit for this second video signal being required The field memory circuit which is used jointly for the first and the second video signal may serve for field frequency doubling or for a possible different function

BRIEF DESCRIPTION OF THE DRAWING

The invention will now be described in greater detail with reference to the accompanying drawing which comprises a sole Figure showing, in a block schematic diagram, a video signal processing circuit according to the invention.

DESCRIPTION OF THE PREFERRED EMBODIMENT

In the Figure a first video signal, which originates from, for example a first television transmitter or a video recorder is applied to an input 1 of a first switching device 3. In the shown state of the first switching device 3, this first video signal is applied to an input 7 of a field memory circuit 9 via an output 5 of the first switching device 3.

A write address signal input 11 of the field memory circuit 9 receives a write address from an output 17 of a write address generator 19 via an output 13 and an input 15 of the first switching device 3, so that the video signal applied to the input 7 of the field memory circuit 9 is written in a first section 21 of this field memory circuit 9.

The first switching device 3 is operated by a time selection signal which is applied to an operating signal input 23 of this device and which originates from an output 25 of a pulse generator 27. This time selection signal keeps the first switching device 3 in the state shown during the line trace periods of the first video signal applied to the input 1 of this device.

The time selection signal applied to the operating signal input 23 of the first switching device 3 brings the first switching device 3 to the state not shown in a number of line retrace periods of the first video signal, for example two out of three periods. The input 7 of the field memory circuit 9 then receives a second video signal from an output 31 of a second switching device 33 via the output 5 and an input 29 of the first switching device 3. The write address signal input 11 then receives a write address from an output 37 of the write address generator 19 via the output 13 and an input 35 of the first switching device 3, so that this second video signal is written in a second section 39 of the field memory circuit 9.

The second video signal may originate, for example from a second television transmitter or video recorder and is generally not synchronized with the first video signal.

The field memory circuit 9 is read by means of a read address which is applied to a read address signal input 41 and which originates from an output 43 of a read address generator 45 which has inputs 47 and 49 receiving a read clock signal and a read synchronizing signal from outputs 51 and 53, respectively, of the pulse generator 27. The video signal, which has been read and which is used for display by a picture display device, appears at an output 55 of the field memory circuit 9 in synchronism with the deflection synchronizing signals to be used for the display, these synchronizing occurring signals at two outputs 57, 59 of the pulse generator 27.

During reading, the first section 21 and the second section 39 of the field memory circuit 9 are jointly read so that the second video signal originating from the second section 39 constitutes a sub-picture in a main picture constituted by the first video signal originating from the first section 21 Dependent on the desired application of the field memory circuit 9, this reading operation can be performed at the same field frequency as the field frequency of the first video signal or at twice its field frequency.

An input 61 of the second switching device 33 is connected via an adjustable attenuator 63 to an input 65 of the circuit to which the second video signal is applied. By means of an adjusting signal applied to an input 67 of the attenuator 63 and originating from an output 69 of the pulse generator 27, the attenuation is adjusted at, for example ¼ during one line period of the second video signal applied to the input 65, subsequently at ½ during one line period and then again at ¼ during one line period. In these three line periods, the second switching device 33 is in the state shown Subsequently, the second switching device 33 assumes the state which is not shown during three line periods of the second video signal at the input 65 and the attenuation of the attenuator 63 is adjusted again at ¼, ½ and ¼ each time during one line period whereafter the second switching device 33 assumes the state shown and the cycle of six line periods is repeated each time.

In the shown state of the second switchin9 device 33, its input 61 is connected via an output 71 to an input 73 of an adder circuit 75, an output of which is connected to an input 77 of a line memory 79, a clock signal input 81 of which receives a write clock signal from an output 87 of the pulse generator 27 via an output 83 and an input 85 of the second switching device 33. An output 89 of the line memory 79 is connected to a further input 95 of the adder circuit 75 via an input 91 and an output 93.

After three line periods the line memory 79 has been written with a weighted average of three line periods of the second video signal and the second switchin9 device 33 assumes the state not shown during the next three line periods of the second video signal. Consequently, the output 89 of the line memory 79 is connected to the input 29 of the first switching device 3 via the input 91 and the output 31 of the second switching device 33.

The clock signal input 81 of the line memory 79 is then connected to an output 101 of the first switching device 3 via an output 97 and an input 99 of the second switching device 33. At least two complete line retrace periods of the first video signal, in which the first switching device 3 assumes the state not shown and the output 101 of the first switching device is connected to an input 103 which receives a clock signal from an output 105 of the pulse generator 27, fall within the three line periods of the second video signal, in which the second switching device 33 is in the state not shown. Consequently, this clock signal is applied to the clock signal input 81 of the line memory 79 and to an input 107 of the write address generator 19 which is connected to the output 101 of the first switching device 3. Under the influence of this clock signal and of a synchronizing signal apPlied to an inPut 109 of the write address generator 19 and originating from an output 111 of the pulse generator 27, the write address for the second section 39 of the field memory circuit 9 is then generated at the output 37 of the write address generator 19. Consequently, the second video signal is transferred from the line memory 79 to the second section 39 of the field memory circuit 9.

In the shown state of the first switchin9 device 3, the clock signal at its input 103 is applied via an output 113 thereof to an input 115 of the write address generator 19 Under the influence of this clock signal and of a synchronizing signal applied to an input 117 of the write address generator 19 and originating from an output 119 of the pulse generator 27, the write address generated at the output 17 of the write address generator 19 is then obtained for the first section 21 of the field memory circuit 9 for writing the first video signal in this circuit.

In the non-shown state of the second switchin9 device 33, its input 85 is connected to an output 121 thereof, which output is connected to a clock signal input 123 of a further line memory 125. An output 127 of this further line memory 125 is then connected via an input 129 and an output 131 of the second switching device 33 to an input 133 of a further adder circuit 135, a further input 137 of which is connected in that case to the input 61 of the second switching device 33 via an output 139 of this device. An output of the further adder circuit 135 supplies the weighted second video signal at an input 141 of the further line memory 125, which video signal is applied after three line periods thereof as a weighted average to the input 29 of the first switching device 3 via the output 31 of the second switching device 33 in the state shown, which is then assumed again by this device, under the influence of the clock signal applied to the clock signal input 123 of the further line memory 125, which clock signal is then obtained from the output 101 of the first switching device 3 via an output 113 and the input 99 of the second switching device 33.

Inputs 145 and 147 of the pulse generator 27 receive a horizontal and a vertical synchronizing signal, respectively, of the first video signal and inputs 149 and 151 receive a horizontal and a vertical synchroniZing signal, respectively, of the second video signal. An output 153 of the pulse generator 27 applies a switching signal to an operating signal input 155 of the second switching device 33, which switching signal sets this device in the state shown each time during three line periods of the second video signal and subsequently in the state not shown during three line periods.

For the sake of clarity, the different connections in the Figure are shown in single lines Since the video signals are digitally processed, connections through which more bits are transmitted at the same time have of course a multiple construction The switching devices, which are shown by means of switches for the sake of clarity, are constituted by gate circuits If desired, the gate circuit 1, 29, 5 may be combined with the gate circuit 91, 93, 31, 129, 131 and if desired, the gate circuits 15, 35, 13 and 101, 113, 103 maY be incorporated in the write address generator 19.

The line memories 79, 125, the second switching device 33 and the attenuator 63 constitute a line memory circuit 157 for the second video signal. In this case this line memory circuit is also arranged as a vertical filter for this second video signal.

In the embodiment described, it has been assumed that the second section 39 of the field memory circuit 9 constituted a one-ninth part of the total storage capacity of the field memory circuit 9. For transferring the second video signal from the line memory circuit 157 to this second section 39, the same clock frequency is used as for writing the first video signal in the first section 21 of the field memory circuit 9. It will be evident that a higher clock frequency can be taken if the second section 39 constitutes a larger part of the field memory circuit 9.

If desired, the adder circuits 75 and 135 may be replaced by a single adder circuit incorporated between the attenuator 63 and the input 61 of the second switching device 33.

What is claimed is:

1. A video signal processing circuit for processing at least a first and a second video signal, said video signal processing circuit comprising a field memory circuit, a write address generator, a first switching device operable by means of a time selection signal for selectively coupling a first and a second output of said write address generator and said first and second video signals, respectively, to an address input and a data input of said field memory circuit for writing the first and the second video signals into a first and a second section, respectively, of the field memory circuit corresponding to first and second parts, respectively, of a picture to be displayed, and a second switching device, characterized in that said video signal processing circuit further comprises a line memory circuit having inputs to which said second video signal is applied via said second switching device and having outputs for selectively supplying a delayed second video signal also via said second switching device, said write and a read address generator, a pulse generator coupled to receive synchronizing signals in said first and second video signals, said pulse generator generating said time selection signal for said first switching device, a further time selection signal for said second switching device, and write and read signals for said write and read address generators, wherein during at least a part of the line trace periods of said first video signal, said pulse generator causes said first switching device to couple said first video signal to said field memory circuit and generates signals for said write address generator to generate addresses for said first section of said field memory circuit, and during at least a part of the line retract periods of said first video signal, said pulse generator causes said first switching device to couple said delayed second video signal to said field memory circuit and generates signals for said write address generator to generate addresses for said second section of said field memory circuit.

2. A video signal processing circuit as claimed in claim 1, characterized in said line memory circuit comprises a first series arrangement of a first accumulator and a first line memory, and a second series arrangement of a second accumulator and a second line memory, said second switching device, in response to said further time selection signal, alternately connecting said second video signal to respective inputs of said first and second accumulators while alternately connecting respective outputs of said second and first line memories to an output of said second switching device carrying said delayed second video signal.

3. A video signal processing circuit as claimed in claim 2, characterized in that said video signal processing circuit further comprises an adjustable attenuator for attenuating said second video signal prior to application to said second switching device, said adjustable attenuator having a control input for receiving a control signal from said pulse generator for weighting each of a predetermined number of lines in said second video signal to be accumulated in said first and second accumulators.

4. A video signal processing circuit for processing at least a first and a second video signal, said video signal processing circuit comprising:
    a field memory circuit;
    a first switching device for writing the first and the second video signals into a first and a second section, respectively, of the field memory circuit corresponding to first and second parts, respectively, of a picture to be displayed;
    means for controlling said first switching device to switch on the writing and addressing of the first video signal into the first section of the field memory circuit during at least a part of the line trace periods of said first video signal, and the writing and addressing of the second video signal into the second section of the field memory circuit during at least a part of the line retrace periods of the first video signal; and
    a line memory circuit for the second video signal including a write and read circuit having a second switching device for writing the second video signal in the line memory circuit and for reading said second video signal from the line memory circuit into said second section of the field memory circuit.

* * * * *